United States Patent [19]

Oguma et al.

[11] 4,023,853
[45] May 17, 1977

[54] MOTORCYCLE FAIRING

[75] Inventors: Yoichi Oguma, Asaka; Minoru Morioka, Niiza, both of Japan

[73] Assignee: Honda Giken Kogyo Kabushiki Kaisha, Tokyo, Japan

[22] Filed: Dec. 23, 1975

[21] Appl. No.: 643,941

[30] Foreign Application Priority Data

Aug. 6, 1975 Japan .............................. 50-108851

[52] U.S. Cl. .............................. 296/78.1; D12/182
[51] Int. Cl.² ......................................... B62J 17/04
[58] Field of Search ........................ 296/78.1, 78 R; 280/289 S; D12/182, 186; 240/7.55

[56] References Cited

UNITED STATES PATENTS 3,154,342  10/1964  Mueller .............................. 296/78.1

OTHER PUBLICATIONS

*Harley–Davidson Motorcycles and Accessories,* Harley–Davidson Motor Co., Inc., 1975, received June 20, 1975, pp. 1–3.

*Primary Examiner*—Joseph F. Peters, Jr.
*Assistant Examiner*—John A. Pekar

[57] ABSTRACT

A motorcycle fairing designed to effectively reduce the influence of lateral wind forces upon its side portions in order to achieve a markedly improved straight-running stability of the motorcycle. The fairing comprises an upper windshield section arranged at the forward portion of the cycle body for protection of the operator from wind and rain, and a lower windshield section connected to the upper windshield section and extending longitudinally from the front to rear end of the cycle body so as to cover the front and side portions thereof, the lower windshield section having upper and lower wind-guiding surfaces respectively formed in a streamlined horizontal section and connected integrally with each other to define a pair of inwardly concave longitudinal grooves or valleys, the upper side surfaces respectively being of such a vertical size or length as to decrease gradually in the rearward direction. With this particular configuration of the lower windshield section, the motorcycle can run in a most stable attitude with a minimum of air resistance as well as greatly minimized lateral wind pressures, which act on the side portions thereof to overturn the cycle sidewise.

6 Claims, 3 Drawing Figures

MOTORCYCLE FAIRING

FIELD AND BACKGROUND OF THE INVENTION

This invention relates to a fairing for a motorcycle and more particularly to a motorcycle fairing of a construction which is adapted to provide an excellent straight-running stability and which is capable of reducing the influence of external forces, such as caused by lateral wind gusts, thereby to stabilize the running attitude of the motorcycle.

In the past, conventional motorcylce fairings have been generally shaped which a streamlined configuration in horizontal section so as to reduce air resistance of the motorcycle in operation to improve the straight-running stability thereof while maintaining the wind-shielding capacity thereof.

In such cases, however, to construct the fairing in the shape of a streamlined horizontal section as referred to above usually requires formation of relatively large wind-shielding side surfaces thereof extended longitudinally in the direction in which the motorcycle equipped with the fairing travels. For this reason, a fairing having relatively large longitudinally elongated side surfaces is liable to be influenced by side wind gusts, thereby impairing the running stability of the motorcycle.

SUMMARY OF THE INVENTION

In view of the above, the present invention seeks to overcome the aforementioned deficiencies in the prior art fairings and thus provide a novel and improved motorcycle fairing of the character described above which is capable of improving the running attitude of a motorcycle fitted with a fairing.

Another object of the present invention is to provide a motorcycle fairing of the character described above which is designed to form a streamlined external configuration in horizontal section effective to minimize the influence exerted by external disturbances, such as caused by lateral wind gusts, without affecting the straight-running stability of the motorcycle to any substantial extent.

The above and other objects, features and advantages of the present invention will become apparent from the following description, when taken in conjunction with the accompanying drawings, which illustrates a presently preferred embodiment of the invention.

DESCRIPTION OF THE PREFERRED EMBODIMENT

Figure 1:
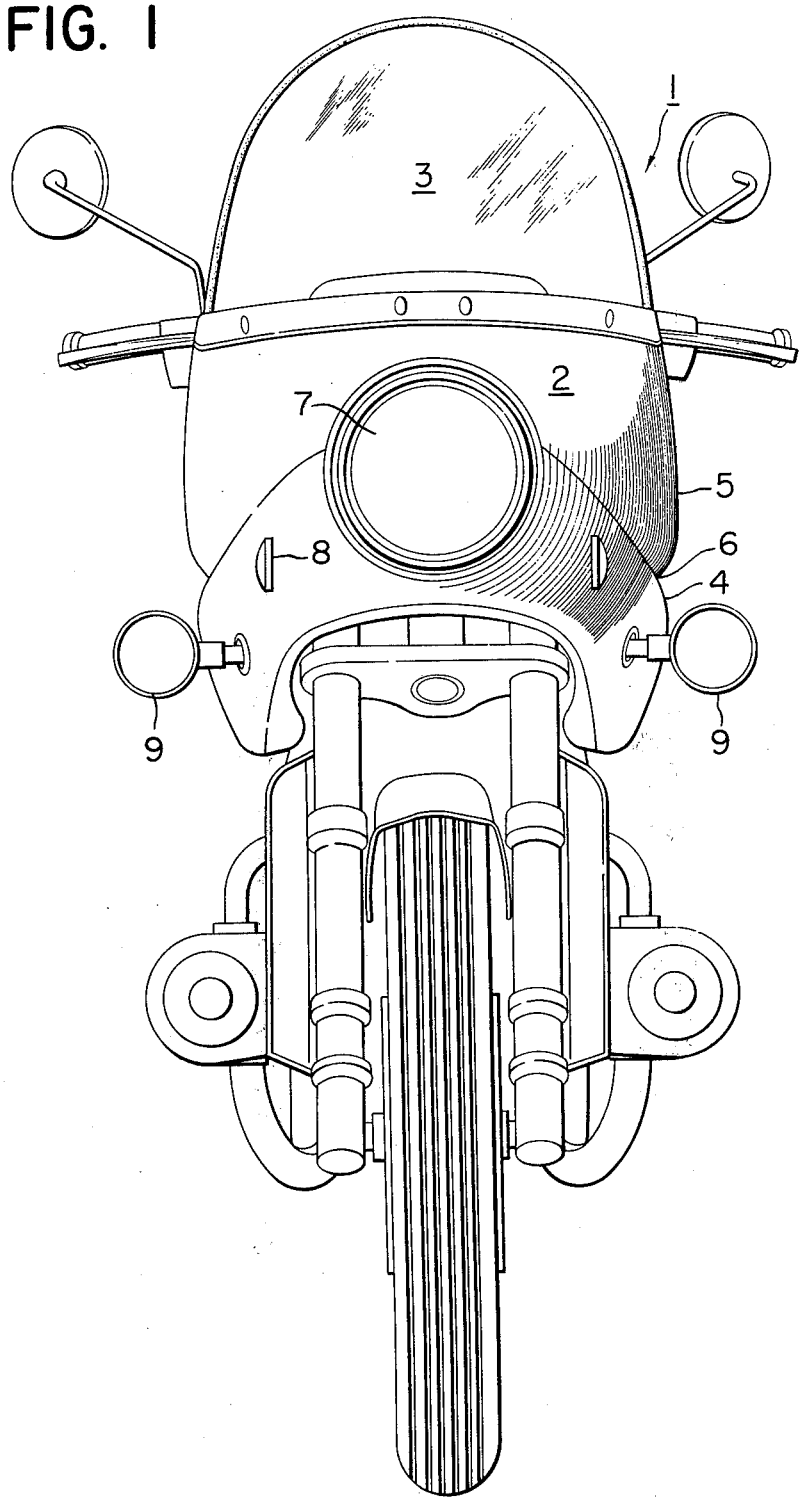
FIG. 1 is a front elevation view of a motorcycle equipped with a fairing embodying the present invention.
Figure 3:
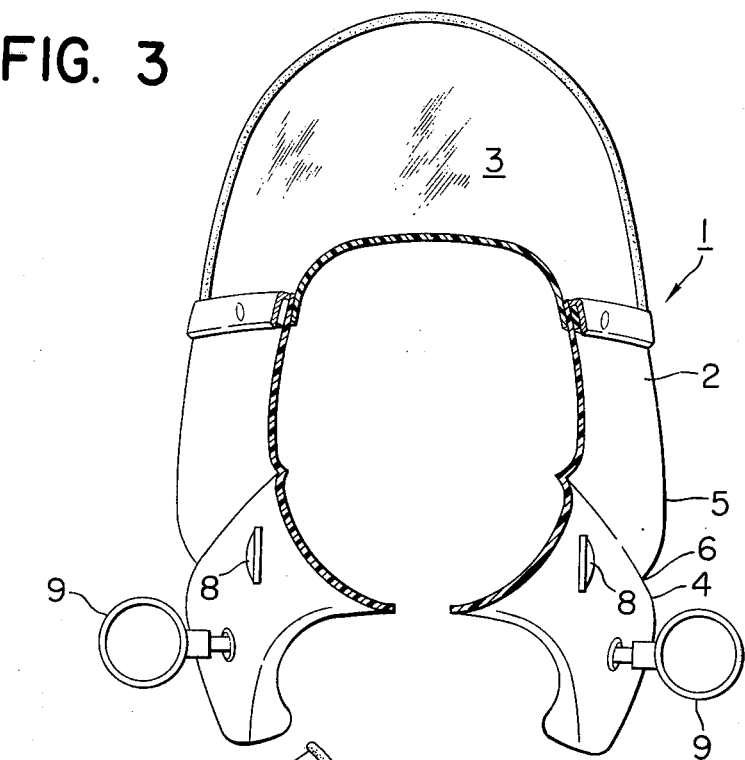
FIG. 3 is a cross-sectional view thereof, taken along line III — III in FIG. 2.

Referring to the drawings, reference numeral 1 designates a fairing for a motorcycle embodying the present invention which is comprised of a lower windshield section 2 made of a glass-fiber-reinforced synthetic resin adapted to cover the front body portion of the motorcycle and an upright upper windshield section 3 made of a transparent synthetic resin mounted on the forward top edge of the lower windshield section and extending upwardly therefrom to cover the upper front portion of the operator.

Figure 2:
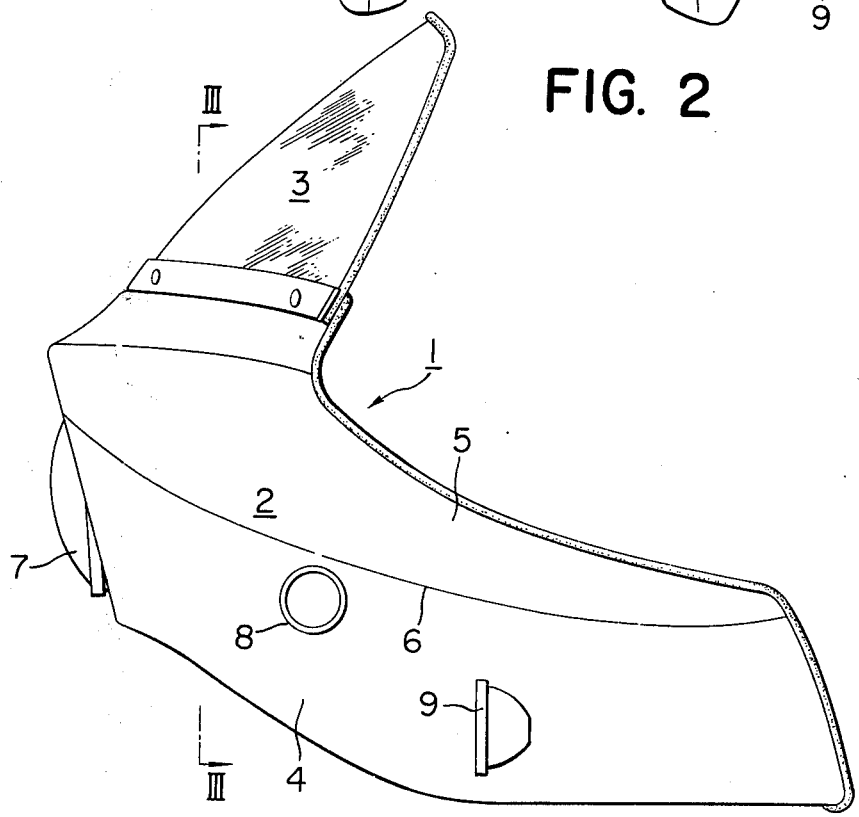
FIG. 2 is a side elevational of the fairing shown in FIG. 1.

The lower windshield section 2 comprises a pair of upper side surfaces 5 with each other to form a streamlined-shaped configuration in horizontal section, the vertical size or length of each of which gradually decreases longitudinally from the front to rear end thereof, and a pair of lower side surfaces 4 of a similar streamlined-shape in horizontal section, integrally joined together at their front portions, these upper and lower side surfaces being integrally joined together to define a pair of inwardly curved or concave longitudinal grooves or valleys 6 on the opposite sides thereof. The interconnecting lines defined by the upper and lower side surfaces 4,5 each extend in the longitudinal direction and are inclined or lowered in the rearward direction, as clearly seen from FIG. 2, the reason of which will be explained later.

In the drawings, reference numeral 7 designates a headlight fitted in an opening formed in the front portion of the lower windshield section 2; 8 and 9 are a pair of reflectors mounted on the side surfaces of the lower windshield section 2.

Now, reference is made to the operation of the fairing 1 as described above.

Assuming that a motorcycle equipped with the present fairing 1 is driven, the wind forces generated upon travel of the motorcycle and applied against the front portion thereof is divided into two streams to flow rearwardly along the external upper and lower side surfaces 5, 4, respectively in the form of a streamlined horizontal section, of the lower windshield section 2 so that air resistance can be reduced as much as possible to improve the straight-running stability of the motorcycle. In this connection, it is to be noted that due to the particular configuration of the lower windshield section 2 in which the upper side surfaces 5 thereof are formed in a streamlined horizontal section and each has a vertical size or length gradually decreasing in the rearward direction and in which those portions of the upper and lower side surfaces 5, 4 of the lower windshield section 2, lying adjacent to the boundary or interconnecting lines thereof are inwardly curved to define the generally V-shaped grooves or valleys 6, the respective wind-guiding upper side surfaces 5 of the lower windshield section 2 are accordingly reduced in area gradually toward the rear ends thereof so that the air stream flowing against the head portion of the motorcycle is forced to flow in the rearward direction at gradually increasing speeds. The purpose of such flow control of the air stream is to reduce the turnover moment of lateral air streams blowing against the side surfaces of the lower windshield section 2, which will be set forth below.

In cases where the motorcycle during travelling is subjected on one side thereof to a lateral wind force, the lateral component of the wind force acts as a turnover moment to overturn the cycle body in a sidewise direction, reducing the straight-running stability of the motor cycle to a considerable extent. In such cases, however, it is possible according to the present invention to minimize such influence of the side wind forces in the following manner; namely, the side wind force, acting on the side surfaces of the lower windshield section 2, is effectively deflected, prior to impinging thereagainst, to be drawn into the rearwardly flowing longitudinal air stream to flow rearwardly with gradually increasing speeds, while at the same time the portion of the side wind force, acting upon the upper side surfaces 5 of the lower windshield section 2, is guided downwardly along the inwardly curved wind-guiding surfaces 5 toward the inwardly concave longitudinal grooves or valleys 6 as it flows in the rearward direction. In this connection, it should be noted that it is possible not only to reduce the lateral component force of the side wind force acting to overturn the cycle body sidewise to a considerable extent, but also to displace the point of action of the overall lateral wind force downwardly toward a lower position so that the moment caused by the side wind tending to overturn the cycle body is greatly reduced with respect to its force and distance.

It will be appreciated from the foregoing description that the wind forces occurring upon travelling of a motorcycle equipped with the present inventive fairing 1 and striking thereagainst is guided to flow rearwardly along the external wind-guiding surfaces, respectively in the form of a streamlined horizontal section which is the least resistant to wind flow, thereby providing a markedly improved straight-running stability of the motorcycle, while at the same time the side wind force applied against the upper side surfaces 5 of the lower windshield section 2 is guided to flow downwardly toward the inwardly curved grooves or valleys 6 and rearwardly along the rearwardly tapered upper wind-guiding surfaces 5 of the lower windshield section 2, whereby the turnover moment exerted on the cycle body by the side wind force is greatly reduced to improve the running stability of the motorcycle.

While only one preferred embodiment has been shown and described herein, it will be appreciated to those skilled in the art that various changes and modifications can be made without departing from the spirit of the invention or the scope of the appended claims.

What is claimed is:

1. A motorcycle fairing comprising a lower windshield section mounted on the front portion of the body of a motorcycle and extending outwardly and rearwardly to cover the upper forward portion thereof, and a transparent upper windshield section mounted upright on said lower windshield section to cover the forward portion of an operator, said lower windshield section including a pair of lower side surface portions integrally connected to one another at the front portions thereof to form a streamlined-shaped configuration in horizontal section, and a pair of upper side surface portions also integrally connected to one another to form a streamlined configuration in horizontal section, said upper side surface portions each having a vertical height which diminishes gradually in rearward direction, said upper and lower side surface portions being integrally joined together to define a pair of inwardly concave grooves at opposite sides of the fairing, said grooves gradually sloping rearwardly downwards along the length of said lower windshield section.

2. A motorcycle fairing as claimed in claim 1 comprising a front headlight, said lower side surface portions embracing a major portion of the front headlight at front portions of said lower side surfaces.

3. A motorcycle fairing as claimed in claim 1 wherein said upper and lower side surface portions are sharply curved inwardly where they are integrally connected to form said grooves such that said grooves are V-shaped.

4. A motorcycle fairing as claimed in claim 3 wherein said grooves are substantially uniformly shaped along the length of said lower windshield section.

5. A motorcycle fairing according to claim 1 wherein said upper windshield section is constituted by a transparent synthetic resin.

6. A motorcycle fairing according to claim 1 wherein said lower windshield section is constituted by a glass-fiber-reinforced synthetic resin.

* * * * *